UNITED STATES PATENT OFFICE.

JENNIA POWERS, OF BROOKLYN, NEW YORK.

IMPROVEMENT IN MEDICAL COMPOUNDS.

Specification forming part of Letters Patent No. 207,368, dated August 27, 1878; application filed July 25, 1878.

*To all whom it may concern:*

Be it known that I, JENNIA POWERS, of Brooklyn, Kings county, New York, have invented a Medical Compound for the Cure of Consumption and Similar Complaints, of which the following is a specification:

My invention consists in a compound composed of the following ingredients, in about the proportions mentioned, and prepared in the manner hereinafter described.

To form this compound, I take of flaxseed, eight ounces; wild-cherry bark, four ounces; licorice extract, four ounces; hoarhound-herb, two ounces; sunflower-seed, one ounce; sassafras-bark, four ounces; Irish moss, two ounces; lungwort-herb, two ounces; slippery-elm bark, two ounces; granulated sugar or equivalent saccharine matter, three and one-half pounds.

All the above ingredients besides the sugar are preferably ground or powdered; but this is not essential. The seeds may be used whole or ground, at option.

These ingredients are all placed into two gallons of water, in which they are boiled till their perfect infusion and mixture take place, the liquor being then gradually boiled down or concentrated to about one gallon, when an equal proportion or one gallon of corn or rye whisky is added, and allowed to remain a short time to thoroughly mix with the infusion and render the solution more perfect, when the clear liquid is then drained off and filled into bottles for use.

This compound is found to have great curative properties for the lungs or throat, and is of great value for the treatment of consumption, colds, or kindred complaints.

Being formed of a combination of the most valuable remedies for lung and throat affections, the compound presents an embodiment of their combined virtues in a concentrated form, possesses healing, nutritious, purifying, and tonic properties, and forms a powerful and pleasant remedy.

The remedy is administered in general doses of one table-spoonful one-half hour before meals, which is continued till relief occurs, which rapidly takes place, except in the most advanced cases of disease.

What I claim as my invention is—

The medical compound herein described for the treatment of consumption and kindred complaints, composed of flaxseed, wild-cherry bark, licorice, hoarhound, sunflower-seed, sassafras-bark, Irish moss, lungwort, slippery-elm bark, sugar, and whisky, prepared in substantially the manner and proportions herein specified.

MRS. JENNIA POWERS.

Witnesses:
JOSEPH H. WINTERS,
HENRY F. HEWLETT.